United States Patent
Denny et al.

(10) Patent No.: US 6,973,416 B2
(45) Date of Patent: Dec. 6, 2005

(54) OILFIELD EQUIPMENT IDENTIFICATION METHOD AND APPARATUS

(75) Inventors: Lawrence A. Denny, Moore, OK (US); Edward E. Patterson, Humble, TX (US)

(73) Assignee: Den-con Tool Company, Oklahoma City, OK (US)

( * ) Notice: Subject to any disclaimer, the term of this patent is extended or adjusted under 35 U.S.C. 154(b) by 0 days.

(21) Appl. No.: 10/634,061

(22) Filed: Aug. 4, 2003

(65) Prior Publication Data

US 2004/0030501 A1  Feb. 12, 2004

Related U.S. Application Data

(63) Continuation of application No. 10/261,551, filed on Sep. 30, 2002, now Pat. No. 6,604,063, which is a continuation of application No. 09/994,304, filed on Nov. 26, 2001, now Pat. No. 6,480,811, which is a continuation of application No. 09/252,045, filed on Feb. 17, 1999, now Pat. No. 6,347,292.

(51) Int. Cl.$^7$ .............................................. G06K 7/08
(52) U.S. Cl. ..................................... 702/188; 235/449
(58) Field of Search .............................. 702/188, 187, 702/182–185; 235/375, 449

(56) References Cited

U.S. PATENT DOCUMENTS

| | | | |
|---|---|---|---|
| 4,202,490 A | 5/1980 | Gunkel et al. | |
| 4,497,029 A | 1/1985 | Kiyokawa | |
| 4,533,823 A | 8/1985 | Vittorio | |
| 4,569,421 A | 2/1986 | Sandstedt | |
| 4,578,991 A | 4/1986 | Nowlin | |
| 4,616,322 A | 10/1986 | Niwa et al. | |
| 4,628,458 A | 12/1986 | Ohta et al. | |
| 4,698,631 A | 10/1987 | Kelly, Jr. et al. | |
| 4,720,626 A | 1/1988 | Nishikawa et al. | |
| 4,742,470 A | 5/1988 | Juengel | |
| 4,745,557 A | 5/1988 | Pekar et al. | |
| 4,780,599 A | 10/1988 | Baus | |
| 4,818,855 A | 4/1989 | Mongeon et al. | |
| 4,850,009 A | 7/1989 | Zook et al. | |
| 5,099,227 A | 3/1992 | Geiszler et al. | |
| 5,142,128 A | 8/1992 | Perkin et al. | |
| 5,157,687 A | 10/1992 | Tymes | |
| 5,202,680 A | 4/1993 | Savage | |
| 5,221,831 A | 6/1993 | Geiszler | |
| 5,225,996 A | 7/1993 | Weber | |
| 5,237,539 A | 8/1993 | Selman | |
| 5,339,074 A | 8/1994 | Shindley et al. | |
| 5,360,967 A | 11/1994 | Perkin et al. | |
| 5,555,655 A | 9/1996 | Yager et al. | |
| 5,698,631 A | 12/1997 | Sigworth et al. | |
| 6,068,394 A | 5/2000 | Dublin, Jr. | |
| 6,206,282 B1 | 3/2001 | Hayes et al. | |
| 6,421,013 B1 | 7/2002 | Chung | |

FOREIGN PATENT DOCUMENTS

WO   WO 93/15561   8/1993

*Primary Examiner*—Marc S. Hoff
*Assistant Examiner*—Edward Raymond
(74) *Attorney, Agent, or Firm*—Dunlap, Codding & Rogers, P.C.

(57) ABSTRACT

An oilfield equipment identifying apparatus comprising a computer loaded with an oilfield equipment database. A unique identification code is input into the computer for each piece of oilfield equipment in the drill string to form a reference in the oilfield equipment database to each piece of oilfield equipment in the drill string. A drilling monitoring device receives input signals indicative of at least one of rotating and non-rotating usage of the drill string and output signals to the computer wherein the computer continuously and automatically monitors the cumulative rotating usage and non-rotating usage of each piece of oilfield equipment identified in the drill string.

2 Claims, 8 Drawing Sheets

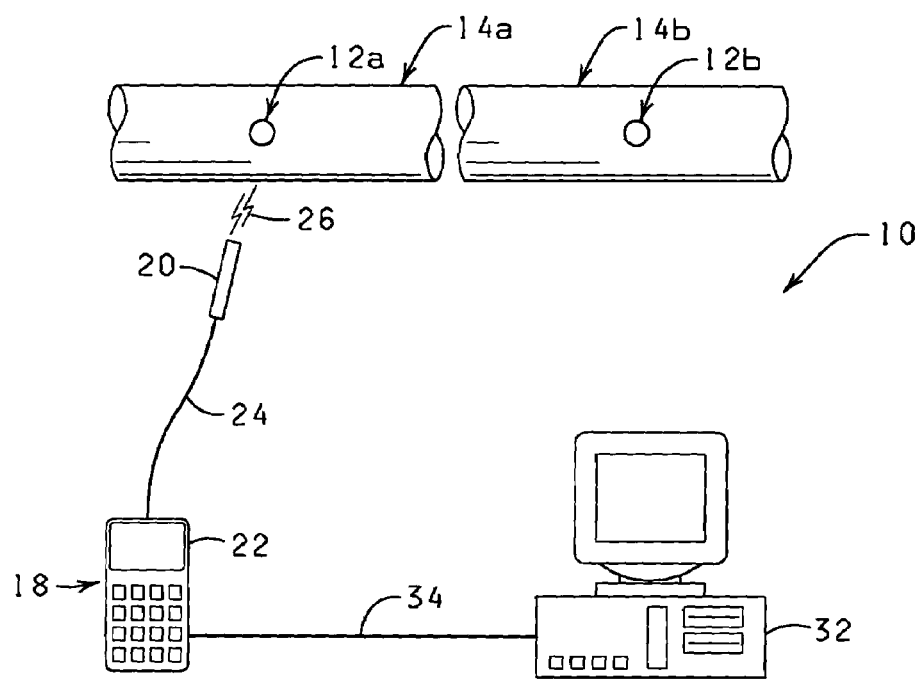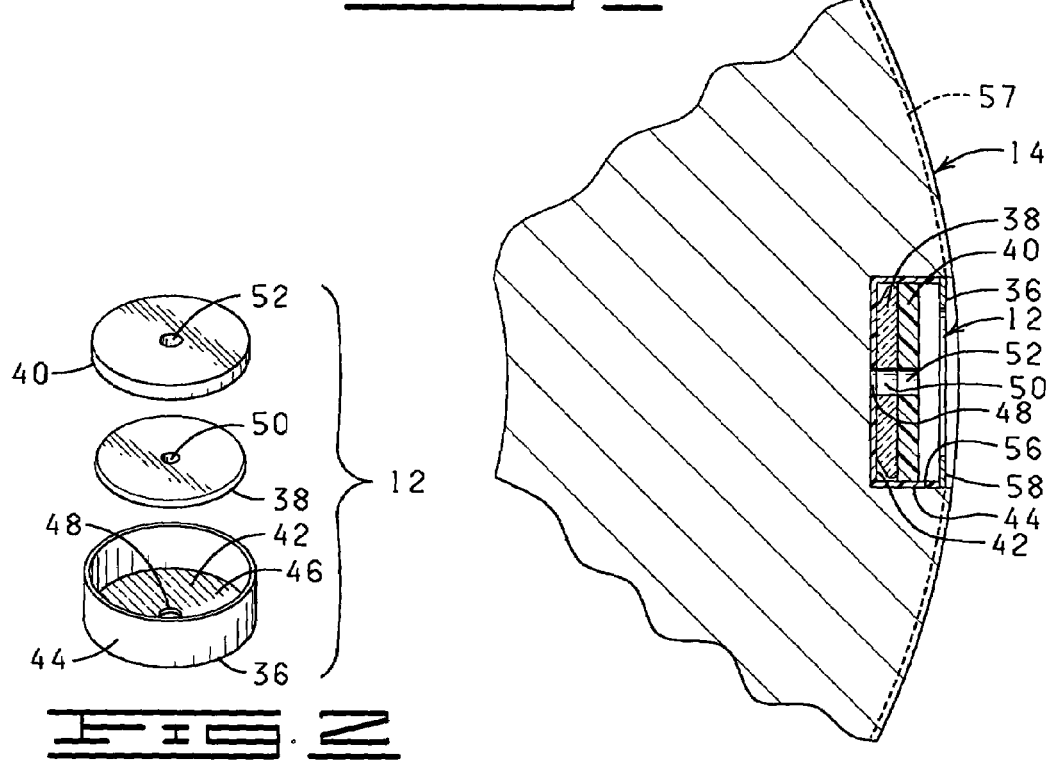

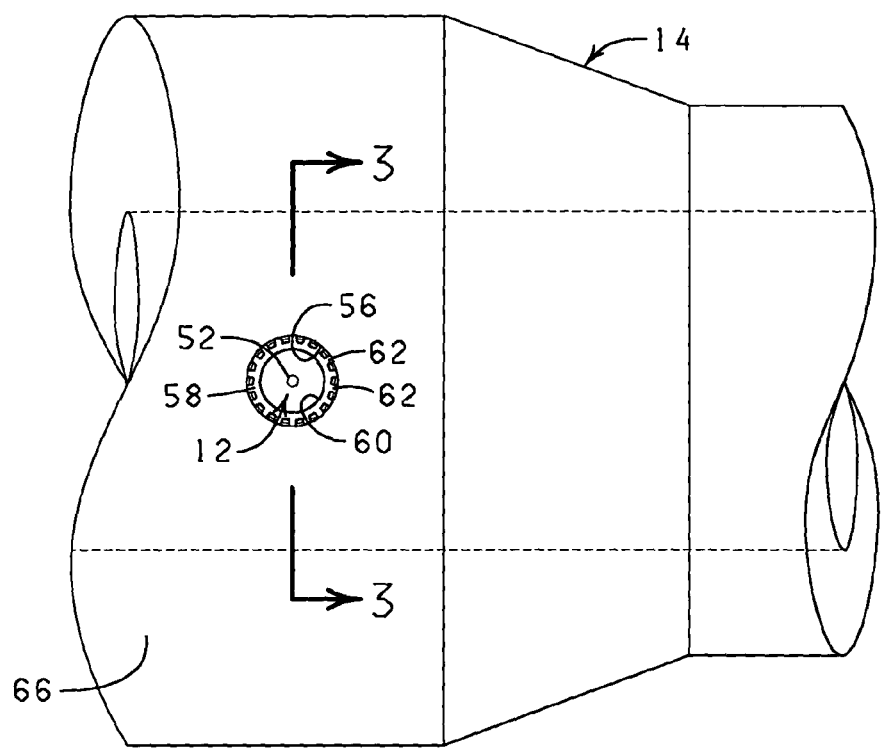
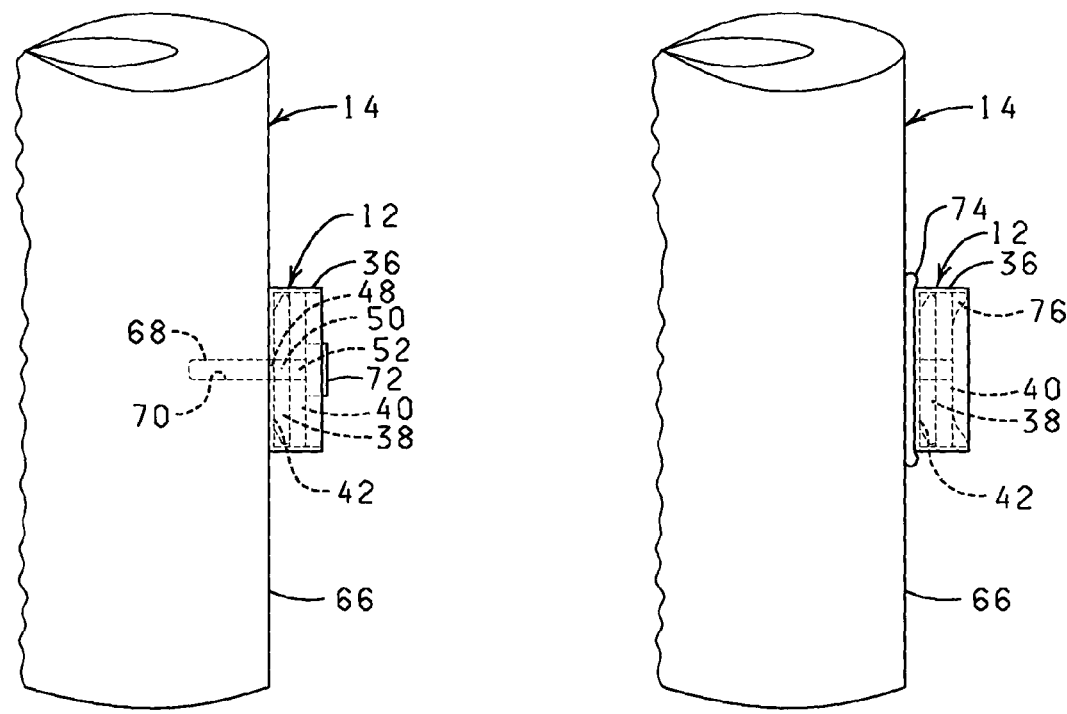
 

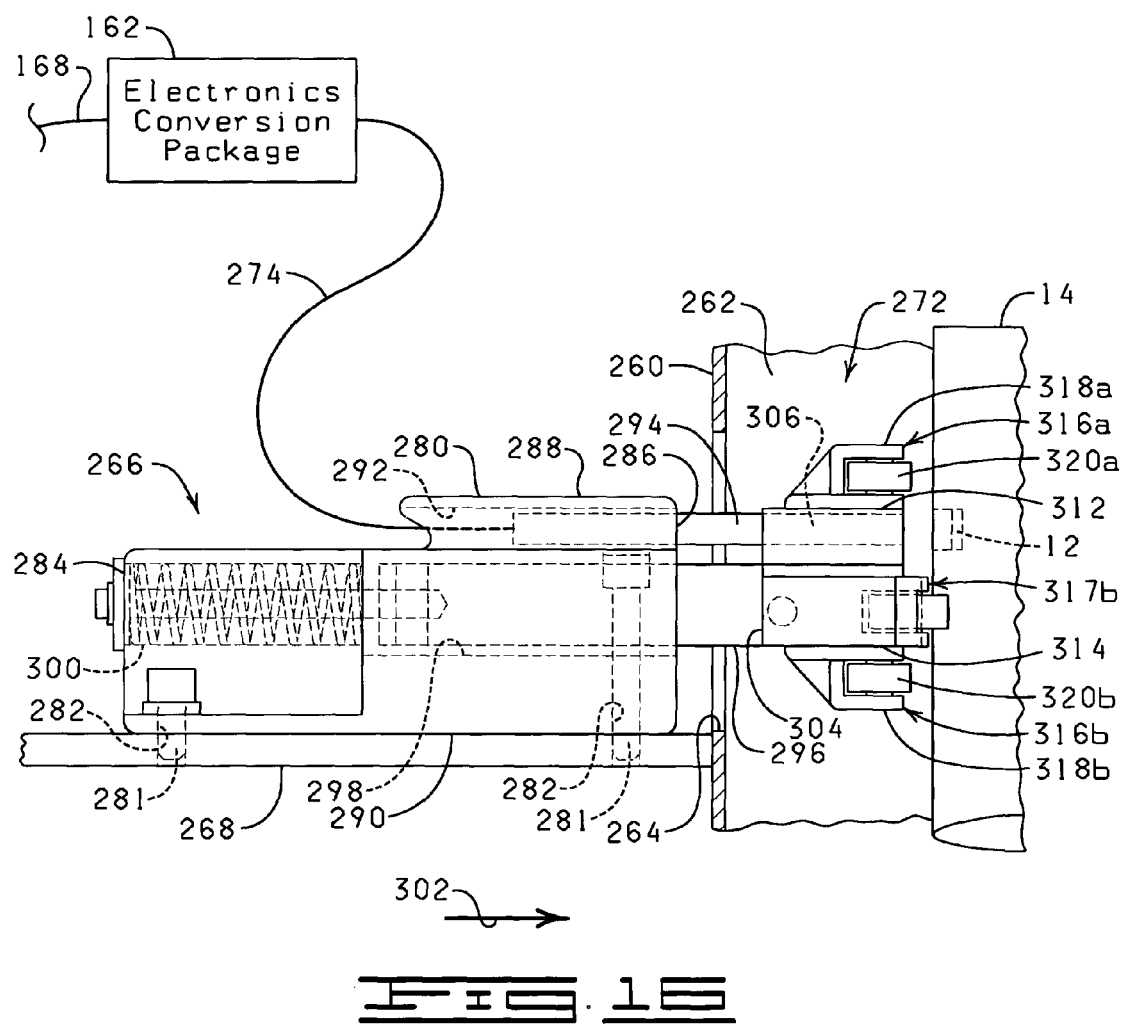

OILFIELD EQUIPMENT IDENTIFICATION METHOD AND APPARATUS

CROSS-REFERENCE TO RELATED APPLICATIONS

This application is a continuation of U.S. Ser. No. 10/261,551, entitled Oilfield Equipment Identification Method and Apparatus, filed on Sep. 30, 2002, now U.S. Pat. No. 6,604,063, which is a continuation of U.S. Ser. No.09/994,304, entitled Oilfield Equipment Identification Method and Apparatus, filed on Nov. 26, 2001; now U.S. Pat. No. 6,480,811; which is a continuation of Ser. No. 09/252,045, entitled Oilfield Equipment Identification Method and Apparatus, filed on Feb. 17, 1999; now U.S. Pat. No. 6,347,292. The entire disclosures of U.S. Ser. Nos. 10/261,551, 09/994,304 and 09/242,045 are hereby incorporated herein by reference.

BACKGROUND OF THE INVENTION

The exploration, development and completion of an oil or gas field requires numerous pieces of oilfield equipment, such as but not limited to casing, drill pipe, packers, oilfield valves and other equipment. The cost of this equipment is relatively high. Accordingly, it is desirable to optimally use and/or reuse many pieces of oilfield equipment for subsequent drilling and development operations. However, equipment undergoes considerable stress during drilling and completion operations. For example, pieces of oilfield equipment, such as drill pipe, may suffer from material fatigue which may ultimately result in failure of the drill pipe. The failure of downhole equipment will require a suspension of drilling operations to recover the remainder of the drill string and other related equipment. It will be appreciated that the recovery of a drill string can be an expensive and time-consuming operation, which should be avoided, if possible. Accordingly, it is desirable to maintain complete service records relating to various pieces of oilfield equipment, such as, but not limited to, drill pipe, for the purposes of determining fatigue and other factors relating to the use of the equipment. By maintaining an accurate, detailed record of the use, inspections, repair and maintenance for each piece of oilfield equipment, the fatigue and other factors relating to the use of the piece of oilfield equipment can be monitored. Thus, the piece of oilfield equipment can be taken out of use before such piece of oilfield equipment fails.

It is to such a method and apparatus for accurately maintaining service records for various pieces of oilfield equipment that the present invention is directed.

SUMMARY OF THE INVENTION

The present invention is an oilfield equipment identifying apparatus for tracking selected parameters for each of a plurality of pieces of oilfield equipment adapted to be inserted into a drill string supported by a drilling rig. The drilling rig supports a drilling device, which selectively rotates the drill string, or a drill bit connected to the drill string. The apparatus comprises a computer loaded with an oilfield equipment database. A reader is provided for inputting into the computer a unique identification code for each piece of oilfield equipment added to the drill string so as to build a grid including a reference to each piece of oilfield equipment in the drill string.

The computer further includes a pipe utilization and identification program and associated hardware for continuously and automatically monitoring the location in the drill string of each piece of oilfield equipment identified in the grid and the cumulative rotating usage and non-rotating usage of each piece of oilfield equipment identified in the grid so as to provide an accurate representation of the historical data for the user to calculate the fatigue of each piece of oilfield equipment identified in the grid.

Real time reports can be generated from the pipe utilization and identification program at any time by actuating a string report function so that rig personnel can monitor the usage of each piece in the drill string and take appropriate corrective action before a costly unexpected event occurs. As will be understood by those skilled in the art, the automatic updating of the cumulative rotating usage and non-rotating usage provides an accurate record of the rotating and non-rotating hours of each piece, thereby substantially reducing the number of costly inspections needed for determining the level of fatigue of each piece.

In other embodiments, various assemblies are provided to enhance the reliability of the pipe utilization and identification program. For example, in one embodiment, the oilfield equipment identifying apparatus includes a fixed mount reader. The fixed mount reader is mounted on the rig floor in a fixed position so that it is possible for the fixed mount reader to read an identification tag included in an identifier assembly mounted onto respective pieces of oilfield equipment without any manual intervention. Thus, the fixed mount reader makes the reading of the identification assemblies more reliable and safe.

In addition, various mounting assemblies for efficiently, reliably and inexpensively attaching the identification assemblies to the pieces of oilfield equipment are disclosed.

Other advantages, and features of the present invention will become apparent to those skilled in the art when the following detailed description is read in conjunction with the attached drawings and the appended claims.

BRIEF DESCRIPTION OF THE SEVERAL VIEWS OF THE DRAWINGS

FIG. 1 is a schematic, diagrammatic view of an oilfield equipment identifying apparatus constructed in accordance with the present invention.

FIG. 2 is a perspective, exploded view of an identifier assembly that is utilized in the oilfield equipment identifying apparatus of FIG. 1.

FIG. 3 is a partial, cross-sectional view of a piece of oilfield equipment, taken along lines 3—3 of FIG. 4, illustrating a system for mounting the identifier assembly shown in FIG. 2 into a piece of oilfield equipment.

FIG. 4 is a top plan view of the piece of oilfield equipment having the identifier assembly recessed therein.

FIG. 5 is a side elevational view depicting another system for securely mounting the identifier assembly of the present invention onto the piece of oilfield equipment.

FIG. 6 is a side elevational view of yet another system for securely mounting the identifier assembly of the present invention onto the piece of oilfield equipment.

FIG. 16 is a side-elevational, partial cross-sectional view of the fixed mount reader.

DETAILED DESCRIPTION OF THE PREFERRED EMBODIMENT

Figure 7:
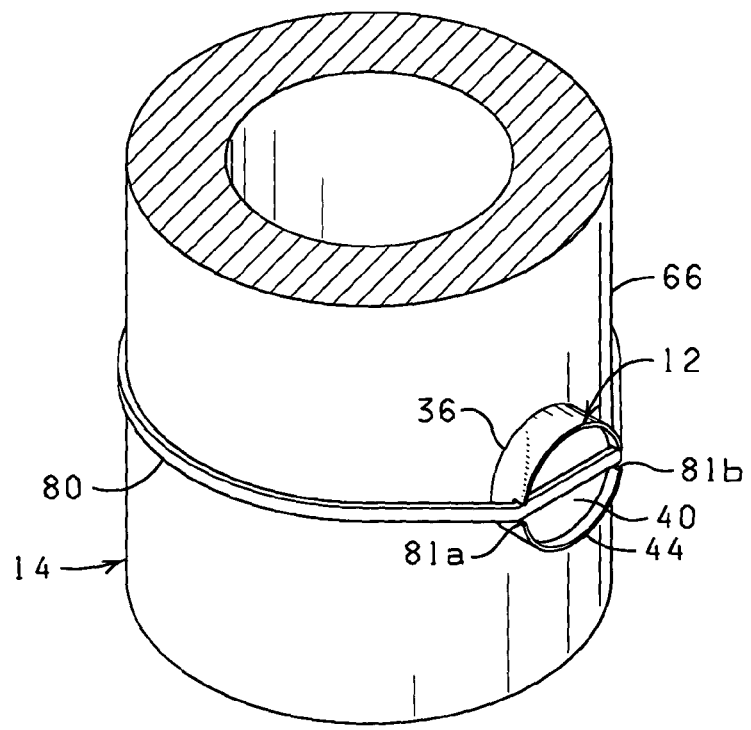
FIG. 7 is a side elevational view of still another system for securely mounting the identifier assembly of the present invention onto the piece of oilfield equipment.

Referring now to the drawings, and in particular to FIG. 1, shown therein and designated by the general reference numeral 10 is an oilfield equipment identifying apparatus, constructed in accordance with the present invention. The oilfield equipment identifying apparatus 10 includes a plurality of identifier assemblies 12 which are mounted on respective pieces 14 of oilfield equipment. The pieces 14 of oilfield equipment can be casing, drill pipe, packers, or the like. The respective identifier assemblies 12 and pieces 14 of oilfield equipment are designated in FIG. 1 by the reference numerals 12a and 12b, and 14a and 14b, for purposes of clarity.

Each of the identifier assemblies 12 is capable of transmitting a unique identification code for each piece 14 of oilfield equipment. Thus, the identifier assembly 12a includes a unique identification code to uniquely identify the piece 14a of oilfield equipment and the identifier assembly 12b includes a unique identification code to uniquely identify the piece 14b of oilfield equipment.

As previously stated, the oilfield equipment identifying apparatus 10 includes a plurality of identifier assemblies 12. For purposes of clarity, however, only one such identifier assembly 12 will be described hereinafter, it being understood that each of the identifier assemblies contained in each oilfield equipment identifying apparatus 10 is substantially identical in its construction and arrangement of parts and function.

Still with reference to FIG. 1, the oilfield equipment identifying apparatus 10 also includes a reader 18. The reader 18 is capable of reading each of the identifier assemblies 12 in the plurality of identifier assemblies. The reader 18 includes a hand-held wand 20, which communicates with a portable computer 22 via a signal path 24. In one embodiment, each identifier assembly 12 includes a passive circuit as described in detail in U.S. Pat. No. 5,142,128, the disclosure of which is hereby incorporated herein by reference. When each identifier assembly 12 includes a passive circuit, the reader 18 can be constructed and operated in a manner as set forth in U.S. Pat. No. 5,142,128.

In use, the wand 20 of the reader 18 is positioned near a particular one of the identifier assemblies 12 located on the piece 14 of oilfield equipment. The unique identification code is transmitted from the identifier assembly 12 to the wand 20 via a signal path 26. Signal path 26 can be an airwave communication system. Upon receipt of the unique identification code, the wand 20 transmits such unique identification code to the portable computer 22 via the signal path 24. The portable computer 22 receives the unique identification code transmitted by the wand 20 and then decodes such unique identification code. The identification code identifying a particular one of the identifier assemblies 12 is then transmitted to a central computer 32 via a signal path 34. The signal path 34 can be cable or airwave transmission systems.

The information transmitted to the central computer 32 from the portable computer 22 can either be done in real time, whereby each unique identification code received by the wand 20 is about immediately transmitted to the central computer 32, or in batch mode, wherein each unique identification code is not transmitted to the central computer 32 until after a number of identifier assemblies 12 have been scanned by the wand 20. Further, the decoded output from the portable computer 22 may be directly displayed on the portable computer 22 for verification purposes.

Referring now to FIG. 2, shown is a perspective, exploded view of one of the identifier assemblies 12. For purposes of clarity, the identifier assembly 12 is shown in FIG. 3 in an assembled condition. The identifier assembly 12 includes a cup member 36, an identification tag 38, and a lid 40. The cup member 36 and lid 40 may be constructed of an electrically insulating material, such as plastic or other durable, electrically isolating materials, so as to isolate the identification tag 38 from the piece 14 of oil field equipment. The identification tag 38 can be a passive circuit identification tag obtainable from Motorola or Texas Instruments, for example. In general, the identification tag 38 has stored therein a unique identification code. The construction and function of the identification tag 38 is discussed in more detail in U.S. Pat. No. 5,142,128, referred to previously, the disclosure of which has been expressly incorporated herein by reference.

In general, the cup member 36 includes a bottom 42 and a substantially continuous sidewall 44, extending from the bottom 42 so as to define a cavity 46. The bottom 42 and the sidewall 44 are sized and adapted so that the identification tag 38 and the lid 40 can be disposed in the cavity 46.

Once the identification tag 38 and the lid 40 are disposed within the cavity 46 of the cup member 36, the cup member 36 and the lid 40 protect the identification tag 38 from taking any direct hits from rigid materials. The interior surface of the sidewall 44 is substantially smooth so that the identification tag 38 and the lid 40 can be disposed directly in the cavity 46 without any twisting or other manipulation of the identification tag 38 and lid 40. In addition, the lid 40 and the identification tag 38 are sized so as to have a loose fit within the cavity 46. As a result, the identification tag 38 is not sealed within the cup member 36. Thus, fluids, very small materials and gases can pass around the lid 40 to engage the identification tag 38 when the identification tag 38 and the lid 40 are disposed within the cavity 46 of the cup member 36.

As will be described in greater detail hereinafter, respective aligned openings 48, 50 and 52 are formed through the bottom 42, the identification tag 38, and the lid 40. The aligned openings 48, 50 and 52 are sized to receive a removable retainer, such as a screw, therethrough, if desired. It should be noted that in some embodiments, the identification tag 38 may not have the opening 50 formed therethrough.

Referring now to FIGS. 3 and 4, one method of installing the identifier assembly 12 into one of the pieces 14 of oilfield equipment (depicted for illustrative purposes only and not by way of limitation as a tool joint pin connection of a section of drill pipe) is shown. A hole 56 is drilled or milled into the piece 14 of oilfield equipment to provide for the mounting therein of the identifier assembly 12. The hole 56 has a predetermined depth so that the identifier assembly 12 can be disposed in the hole 56 below a maximum wear diameter 57 of the piece 14 of oilfield equipment. Once the identifier assembly 12 is disposed in the hole 56, the identifier assembly 12 is maintained in the hole 56 by a suitable retainer, such as a friction grip retainer 58, which is pressed into the hole 56. The openings 48 and 52 formed through the bottom 42 and the lid 40 serve to relieve pressure behind the identifier assembly 12 so that such pressure does not build up behind the identifier assembly 12 and push the identifier assembly 12 out of the hole 56 formed in the piece 14 of oilfield equipment. More specifically, the openings 48 and 52 serve to relieve pressure from behind the bottom 42 of the cup member 36. As shown in FIG. 4, the friction grip retainer 58 includes a ring-shaped support portion 60 and a plurality of lugs 62 extending therefrom. Only two of the lugs 62 have been numbered in FIG. 4 for purposes of clarity. The lugs 62 of the friction grip retainer 58 are sized such that the lugs 62 frictionally engage the piece 14 of oilfield equipment when the friction grip retainer 58 is being pressed into the hole 56 to prevent the inadvertent removal of the identifier assembly 12 and the retainer 58 from the hole 56.

The before-mentioned method of mounting the identifier assemblies 12 on the pieces 14 of oilfield equipment, whereby the identifier assemblies 12 are recessed in the pieces 14 of oilfield equipment, is especially useful in applications where it is likely that the identifier assembly 12 could be wiped off the exterior surface 66 of the piece 14 of oilfield equipment. However, in certain instances, such as when the piece 14 of oilfield equipment is a pump, a valve, an engine or other piece of oilfield equipment where the likelihood of the identifier assembly 12 being wiped off the exterior surface 66 is decreased, it has been found to be more economical to mount the identifier assembly 12 to the exterior surface 66 of the piece 14 of oilfield equipment.

Referring now to FIGS. 5, 6 and 7, three systems for mounting the identification assembly 12 to the exterior surface 66 of the piece 14 of oilfield equipment are disclosed. As shown in FIG. 5, an opening 68 is formed through the exterior surface 66 of the piece 14. The opening 68 has a threaded interior surface 70. The bottom 42 of the cup member 36 is disposed adjacent the exterior surface 66 of the piece 14 of oilfield equipment such that the openings 48, 50 and 52 are aligned with the opening 68 formed in the piece 14 of oilfield equipment. The identifier assembly 12 is held in this position while a threaded member 72, such as a screw, is disposed through the aligned openings 48, 50, 52 and 68. The threaded member 72 is then rotated so as to threadingly engage the threaded interior surface 70 of the opening 68 to rigidly maintain the identifier assembly 12 on the piece 14 of oilfield equipment. In this position, the identification tag 38 is compressed between the lid 40 and the bottom 42 of the cup member 36 by the threaded member 72.

Referring now to FIG. 6, yet another system for mounting the identifier assembly 12 to the exterior surface 66 of the piece 14 of oilfield equipment is shown. In this embodiment, a first bonding material 74, such as an epoxy, is disposed between the exterior surface 66 and the bottom 42 of the cup member 36 so as to bondingly connect the bottom 42 of the cup member 36 to the exterior surface 66. In the embodiment shown in FIG. 6, a second bonding material 76, such as a layer of epoxy, is disposed between the lid 40 and the cup member 36 so as to bondingly connect the lid 40 to the cup member 36, thereby retaining the identification tag 38 within the cup member 36.

Referring now to FIG. 7, a third embodiment of a system for securing the identifier assembly 12 to the exterior surface 66 of the piece 14 of oilfield equipment is shown. In the embodiment shown in FIG. 7, a flexible retainer 80, such as a strap, string or a wire, is disposed about the exterior surface 66 and threaded through a pair of aligned slots 81a and 81b formed through the cup member 36 of the identifier assembly 12. The flexible retainer 80 extends across the lid 40 so as to retain the lid 40 within the cavity 46 of the cup member 36. To retain the identifier assembly 12 on the piece 14 of oilfield equipment, the ends of the flexible retainer 80 can be secured together by any suitable connector means so as to tightly dispose the flexible retainer 80 about the exterior surface 66 of the piece 14 of oilfield equipment.

Figure 8:
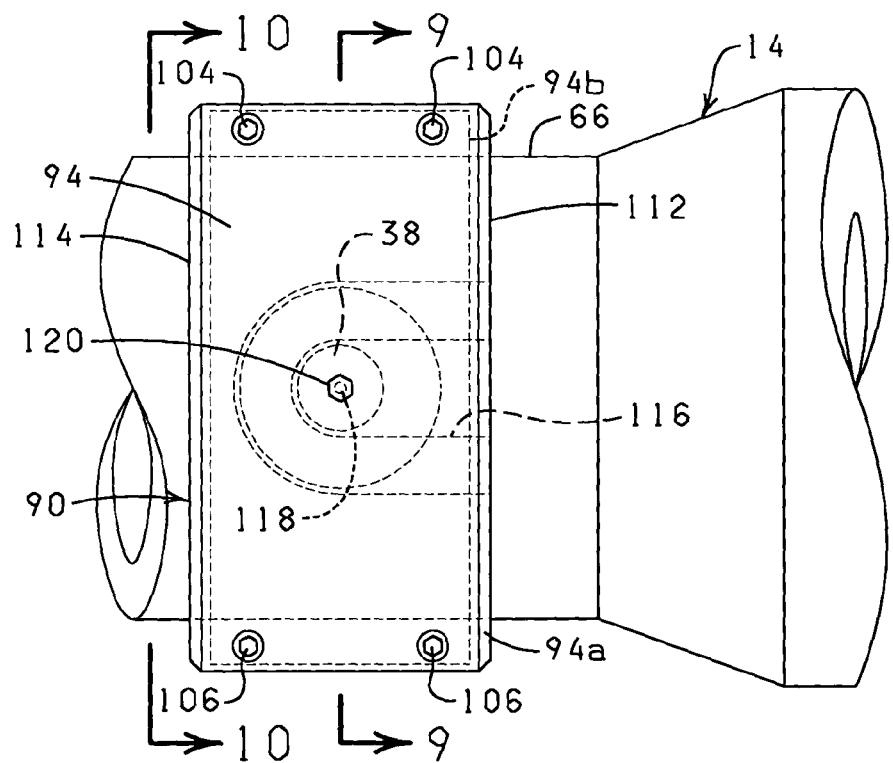
FIG. 8 is a top plan view of a second embodiment of an identifier assembly constructed in accordance with the present invention, which is securely mounted on an exterior surface of the piece of oilfield equipment.
Figure 9:
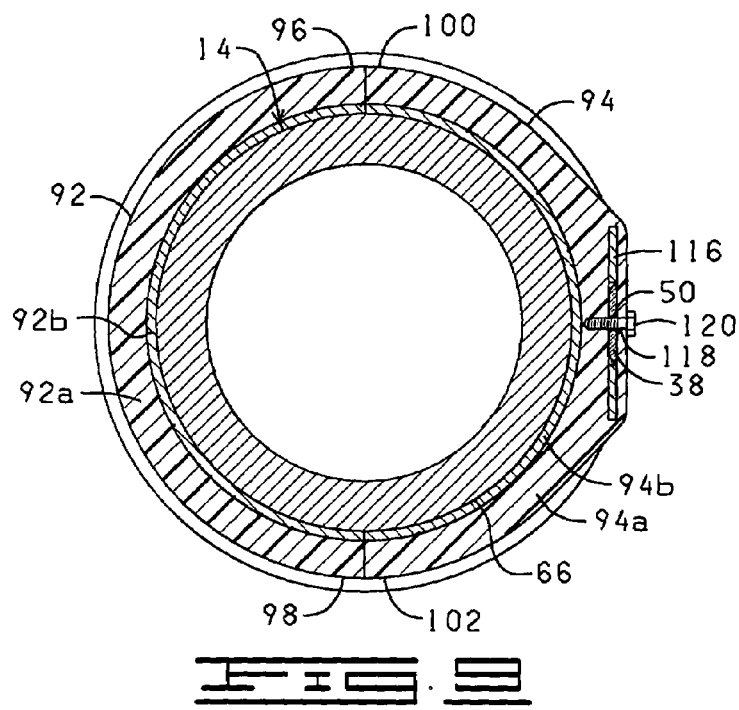
FIG. 9 is a cross-sectional view of the identifier assembly and the piece of oilfield equipment, taken along the lines 9—9 in FIG. 8.
Figure 10:
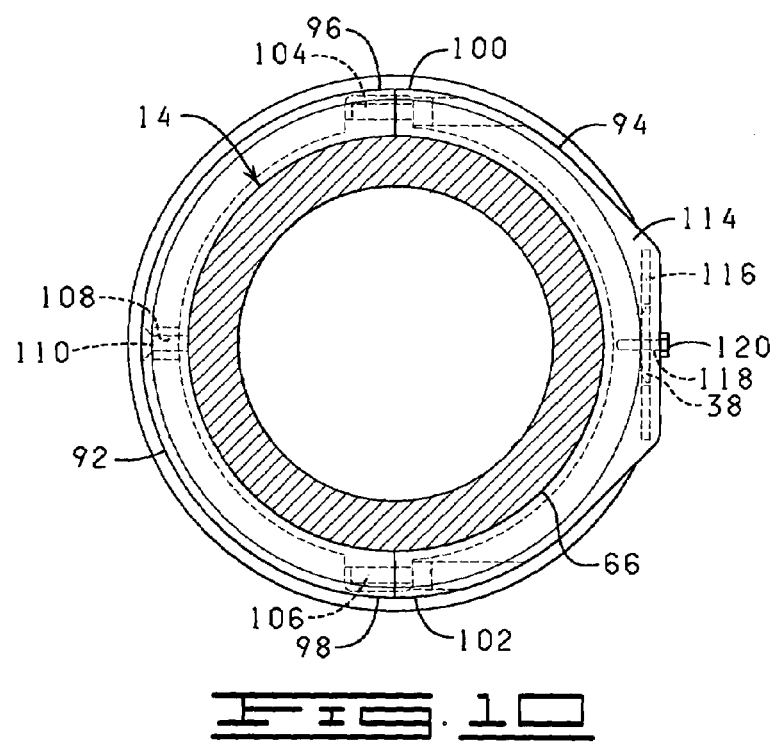
FIG. 10 is a cross-sectional view of the identifier assembly and the piece of oilfield equipment, taken along the lines 10—10 in FIG. 8.

Shown in FIGS. 8, 9 and 10, and designated by the general reference numeral 90, is another embodiment of an identifier assembly constructed in accordance with the present invention. The identifier assembly 90 is substantially identical in function to the identifier assembly 12, except that the identifier assembly 90 has been adapted and constructed to be resiliently and removably disposed about the exterior surface 66 of the piece 14 of oilfield equipment for use in situations where it may be likely that the mounting systems depicted in FIGS. 5–7 for the identifier assembly 12 could be wiped off the exterior surface 66 of the piece 14 of oilfield equipment or the piece 14 is a shoulderless drill pipe.

In FIGS. 8, 9 and 10, the piece 14 of oilfield equipment is depicted for illustrative purposes only and not by way of limitation as a tool joint pin connection of a section of drill pipe. In general, the identifier assembly 90 is shaped to matingly conform to the exterior surface 66 of the piece 14 of oilfield equipment. In one embodiment, the identifier assembly 90 includes a first member 92 (FIGS. 9 and 10) and a second member 94. The first member 92 includes a layer of resilient material 92a supported on an underlying frame member 92b. The second member 94 includes a layer of resilient material 94a supported on an underlying frame member 94b. The first member 92, and the second member 94 are shaped so as to matingly conform about the exterior surface 66 of the piece 14 of oilfield equipment, as shown in FIGS. 8–10. The layers of resilient materials 92a and 94a included in the first and second members 92 and 94 can be constructed of a material which is substantially impervious to hydrocarbons or oilfield chemicals, such as molded or vulcanized rubber. The frame members 92b and 94b included in the first and second members 92 and 94 can be constructed of a strong, durable material which is substantially impervious to hydrocarbons or oilfield chemicals, such as stainless steel.

As shown in FIGS. 9 and 10, the first member 92 has a first end 96 and a second end 98, and the second member 94 has a first end 100 and a second end 102. The first end 96 of the first member 92 is disposed substantially adjacent the first end 100 of the second member 94. In this position, the first end 96 of the first member 92 is connected, either removably or permanently, to the first end 100 of the second member 94 via any suitable retainer 104, such as a pair of screws (shown) or a hinge. The second end 98 of the first member 92 is disposed substantially adjacent the second end 102 of the second member 94. In this position, the second end 98 of the first member 92 and the second end 102 of the second member 94 are removably connected via any suitable retainer, such as a pair of screws 106. To prevent the identifier assembly 90 from rotating about the exterior surface 66, an opening 108 can be provided through the first member 92 so that a corresponding retainer, such as a screw 110, can be disposed in the opening 108 and tightened against the exterior surface 66 of the piece 14 of oilfield equipment. As best shown in FIG. 8, the second member 94 has a first side 112 and a second side 114. To securely maintain the identification tag 38 on the piece 14 of oilfield equipment, a slot 116 is formed through the first side 112 such that the slot 116 extends a distance toward the second side 114. The slot 116 is sized and dimensioned to receive the identification tag 38 therein. To maintain the identification tag 38 securely within the slot 116, an opening 118, which communicates with the slot 116, is formed through the second member 94. In use, the identification tag 38 is placed in the slot 116 such that the opening 50 formed through the identification tag 38 is aligned with the opening 118 formed through the second member 94. In this position, a retainer, such as a screw 120, is disposed through the openings 118 and 50 formed through the second member 94 and the identification tag 38, such that the screw 120 securely retains the identification tag 38 within the slot 116.

Thus, it can be seen that the identifier assembly 90 provides a relatively inexpensive, secure method for removably mounting the identification tag 38 on the exterior surface 66 of the piece 14 of oilfield equipment. The layer of resilient material 94a of the second member 94 is constructed of an electrical insulating material, so as to isolate the identification tag 38 from the piece 14 of oilfield equipment. Any of the screw's 104, 106, and 120 can be used in combination with an appropriate lock washer (not shown) so as to more securely maintain such screws 104, 106, and 120 in their respective openings.

Figure 11:
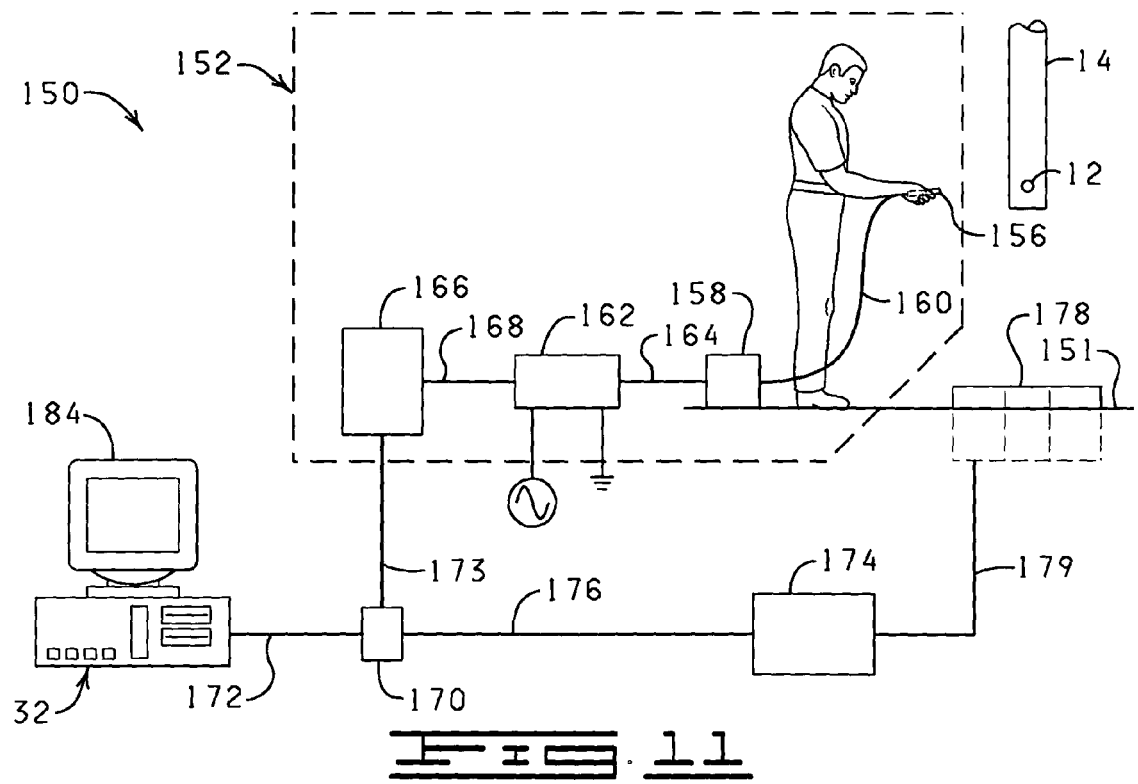
FIG. 11 is a schematic, diagrammatic view of a second embodiment of an oilfield equipment identifying apparatus, constructed in accordance with the present invention.

Referring now to FIG. 11, shown therein and designated by the general reference numeral 150 is a second embodiment of an oilfield equipment identifying apparatus, constructed in accordance with the present invention. The oilfield equipment identifying apparatus 150 includes a plurality of the identifier assemblies 12 and/or 90 which are mounted on respective pieces 14 of oilfield equipment as described above. The oilfield equipment identifying apparatus 150 includes a reader 152, which communicates with the central computer 32.

The central computer 32 contains an oilfield equipment database which functions the same as the oilfield equipment database set forth in U.S. Pat. No. 5,142,128, which disclosure has been incorporated herein by reference. In addition, the oilfield equipment database contained in the central computer 32 is provided with additional functionality, as will be described hereinafter. The oilfield equipment identifying apparatus 150 has been constructed and adapted to be utilized in reading the identifier assemblies 12 on various pieces 14 of oilfield equipment located on the rig floor 151 of an oil drilling rig.

The reader 152 includes a hand-held wand 156. The hand-held wand 156 is constructed in a similar manner as the hand-held wand 20, which was described hereinbefore with reference to FIG. 1. The wand 156 is generally adapted to be carried by an individual working on the rig floor 151 so that the individual can position the hand-held wand 156 near various identifier assemblies 12 and download the unique identification code stored in the identifier assemblies 12 so that the various pieces 14 of oilfield equipment can be identified. The hand-held wand 156 is attached to a storage box 158 via a signal path 160, which is typically a cable having a length of about forty feet, for example. Storage box 158 is positioned on the rig floor 151 and serves as a receptacle to receive the hand-held wand 156 and the signal path 160 when the hand-held wand 156 is not in use.

An electronic conversion package 162 communicates with a connector on the storage box 158 via signal path 164, which may be an airway or a cable communication system so that the electronic conversion package 162 receives the signals indicative of the identification code stored in the identifier assemblies 12, which is read by the hand-held wand 156. In response to receiving such signal, the electronic conversion package 162 converts the signal into a format which can be communicated an appreciable distance therefrom. For example, the electronic conversion package 162 may convert the signal received from the hand-held wand 156 into or from RS-232, RS-422, RS-485, or RS-530 format. The converted signal is then output by the electronic conversion package 162 to a profibuss 166 via a signal path 168. The profibuss 166, which is connected to the drilling rig local area network and/or the programmable logic controller (not shown) in a well-known manner, receives the converted signal output by the electronic conversion package 162.

The central computer 32 includes an interface unit 170. The interface 170 communicates with the central computer 32 via a signal path 172, which may be an RS-232 communication port, or other serial device, or a parallel port. The interface unit 170 may also communicates with the profibuss 166 via a signal path 173. The interface unit 170 receives the signal, which is indicative of the unique identification codes read by the hand-held wand 156, from the profibuss 166, and a signal from a drilling monitoring device 174 via a signal path 176. The drilling monitoring device 174 communicates with at least a portion of a drilling device 178 via a signal path 179. The drilling device 178 can be supported by the rig floor 151, or by the drilling rig. The drilling device 178 can be any drilling device which is utilized to turn pieces 14 of oilfield equipment, such as drill pipe or a drill bit to drill a well bore. For example, but not by way of limitation, the drilling device 178 can be a rotary table supported by the rig floor 151, or a top mounted drive supported by the drilling rig, or a downhole mud motor suspended by the drill string and supported by the drilling rig.

The drilling monitoring device 174 monitors the drilling device 178 so as to determine when the piece 14 or pieces 14 of oilfield equipment in the drill string are in a rotating condition or a non-rotating condition. The drilling monitoring device 174 outputs a signal to the interface unit 170 via the signal path 176, the signal being indicative of whether the piece(s) 14 of oilfield equipment are in the rotating or the non-rotating condition. As will be explained hereinafter, the central computer 32 is loaded with a pipe utilization and identification program in its oilfield equipment database which receives and automatically utilizes the signal received by the interface unit 170 from the signal path 176 to monitor, on an individualized basis, the rotating and non-rotating hours of each piece 14 of oilfield equipment in the drill string. In one embodiment, the drilling monitoring device 174 is a tachometer communicating with the drilling device 178.

For example, when the drilling device 178 is the downhole mud motor (which selectively rotates the drill string's drill bit while the drill string's pipe remains stationary), the central computer 32 logs the non-rotating usage of each piece 14 of the drill string's pipe. In the case where the drilling device 178 is the downhole mud motor, the central computer 32 has stored therein a reference indicating that the drilling device 178 is the downhole mud motor so that the central computer 32 can accurately log the non-rotating usage of each piece 14 of oilfield equipment included in the drill string that suspends the drilling device 178.

Figure 12:
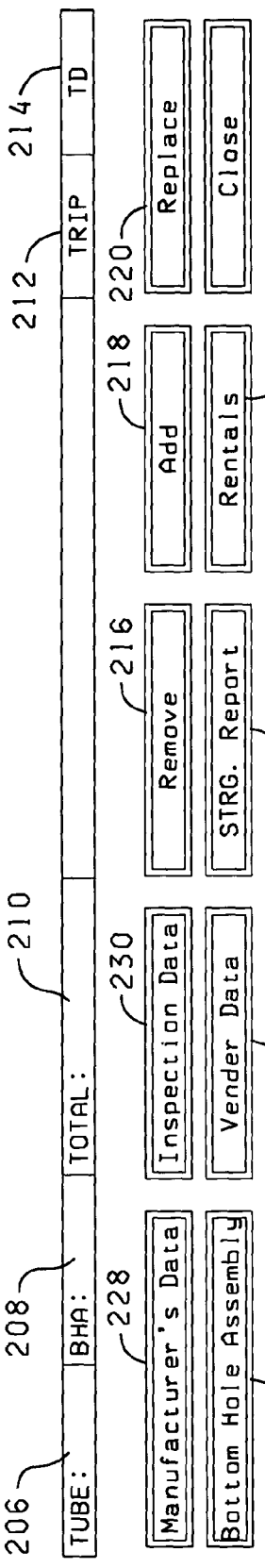
FIG. 12 is front elevational view of a typical screen on a monitor of a central computer when the central computer is running a pipe utilization and identification program constructed in accordance with the present invention.

Shown in FIG. 12 is a typical screen 182 on a monitor 184 of the central computer 32, when the central computer 32 is running the pipe utilization and identification program included in the oilfield equipment database. The screen 182 includes a grid 186 for organizing the information displayed by the pipe utilization and identification program on the screen 182. The grid 186 is comprised of a plurality of columns of data and the data is descriptive of particular features of each piece 14 of oilfield equipment included in a drill string. The data columns may be, but are not limited to, a position in the drill string column 188, a unique identification code column 190, a serial number column 192, a description column 194, a strap length column 196, an owner column 198, a rotating hour column 200, a non-rotating hour column 202, and a total footage drilled column 204.

The screen 182 also displays three fields, designated in FIG. 12 as a "Tube" field 206, a "BHA" field 208, and a "Total" field 210. The Tube field 206 displays the length of the pipe that is currently being used in the drill string for drilling the oil well. The BHA field 208 displays the length of the bottom hole assembly that is currently being utilized in the drill string. The Total field 210 displays the sum of the lengths of the tube assembly and the bottom hole assembly.

The screen 182 is provided with a trip function 212, which is used when all pieces 14 of oilfield equipment are pulled out of the hole, or a bit or other piece 14 of oilfield equipment is changed. The trip function 212 will update the total footage of each joint of pipe in the drill string as far as total footage is concerned. When one of the pieces 14 of oilfield equipment, such as a joint of pipe, is scanned by the wand 156, such piece is added to the top of the drill string, the length of that piece 14 is added to the previous amount of footage in the drill string and displayed in the total footage column 204.

The pipe utilization and identification program is also provided with a TD function 214, as indicated on the screen 182. When actuated, the TD function 214 will clear the grid 186 and store the data in a historical database for future reference. The TD function 214 must be error protected with an <ARE YOU SURE?>function to stop inadvertent erasure of the grid 186.

The pipe utilization and identification program also includes a "remove function" 216, which permits an individual to remove the indication in the database of one of the pieces 14 of oilfield equipment in any position in the drill string by merely highlighting the piece 14 and actuating the "remove function" 216. When the piece 14 is removed, a record is added to the historical database to indicate where the piece 14 was in the drill string, and when the piece 14 was removed from the drill string.

The pipe utilization and identification program is also provided with an "add function" 218, to permit an individual to add a new record indicative of the historical information of a particular one of the pieces 14 of oilfield equipment, when a piece 14 is added to the top of the drill string while drilling. If the identifier assembly 12 on the piece 14 is scanned from the rig floor 151, the piece 14 will go directly to the top of the drill string, and a reference in the pipe utilization and identification program will be created in the grid 186 to indicate that such piece 14 has been added to the drill string. Historical (or cumulative) information regarding such piece 14 will be retrieved from the historical database and added to the grid 186 so that cumulative data for the piece 14 is monitored.

The pipe utilization and identification program also includes a "replace function" 220, which is used when a specific piece 14 of oilfield equipment is to be replaced in the drill string. The identification assembly 12 on the piece 14 can be scanned with the wand 156 from the rig floor 151, thereby automatically highlighting the piece 14 on the screen 182 (by the pipe utilization and identification program matching the identification code stored in the column 190 with the scanned identification code). Alternatively, the piece 14 to be replaced can be highlighted manually via a mouse (not shown) connected to the central computer 32. The "replace function" 220 is then actuated and the new piece 14 is added to the grid 186 of the pipe utilization and identification program in a similar manner as described above with reference to the "add function" 218. Information about the removed piece 14 is then recorded in the historical database.

The pipe utilization and identification program is also provided with a bottom hole assembly function 222. The bottom hole assembly function 222, when actuated, displays only the pieces 14 that are in the bottom hole assembly on the grid 186.

The pipe utilization and identification program also includes a string report function 224. The string report function 224 generates a report to screen or printer of all pieces 14 currently being used in a drill string. Included in the report can be all of the information set forth in the grid 186.

A rental function 226 is also included in the pipe utilization and identification program. The rental function 226 is utilized when a particular piece 14 of oilfield equipment is rented from another company. The rental function 226 may include fields for historical or descriptive data, such as item description, owner, serial number, optional rotating hours, optional non-rotating hours, and required shoulder-to-shoulder length, for example. The records in the rental function 226 can be saved to a file, retrieved from a file, removed from a file, and/or added to the grid 186 via various buttons on the screen 182.

Thus, it can be seen that when the identifier assemblies 12 on the pieces 14 of oilfield equipment, such as a joint of pipe, drill collar, heavyweight drill pipe or the like, is scanned via the reader 152 on the rig floor 151, data regarding that particular piece 14 is obtained from the historical database by the central computer 32 and displayed in the grid 186 on the screen 182. As each piece 14 of the drill string is added to the drill string for drilling, an indication of each such component is displayed in succession on the monitor 184 in the grid 186, exactly as such piece is being used in the drill string to give an indication of the piece's location in the drill string.

Therefore, it can be seen that displayed in the grid 186 is identification information such as identification code, serial number, description, length, cumulative rotating hours, cumulative non-rotating hours, total footage, stand number and stand placement regarding the specific pieces 14 being used.

Various functions are also provided to allow the user to review data on each individual piece 14 in the grid 1186 by selecting such piece 14 by double-clicking on it, for example. Various current data can be reviewed for each piece 14, such as inspections, repairs, logistics, purchasing, applications and spare parts, if required, as indicated by the functions 228, 230 and 232.

In addition, the central computer 32 automatically and continuously monitors the signal path 172 so as to determine whether the drilling device 178 is in the rotating condition or the non-rotating condition. If the signal received by the central computer 32 on the signal path 172 indicates that one or more of the pieces 14 in the drill string are rotating, the pipe utilization and identification program included in the oilfield equipment database automatically and continuously updates the information in the rotating hour column 200 for each of the pieces 14 in the grid 18 that are rotating, and the information in the non-rotating hour column 202 for each of the pieces 14 that are not rotating so as to monitor the cumulative rotating usage and non-rotating usage for each piece 14 in the grid 186. If the signal received by the central computer 32 on the signal path 172 from the interface unit 170 indicates that all of the pieces 14 of oilfield equipment in the drill string are in the non-rotating condition, the pipe utilization and identification program included in the oilfield equipment database automatically updates the information in the non-rotating hour column 202 for each of the pieces 14 in the grid 186, so as to monitor the cumulative non-rotating usage for each piece 14 in the grid 186.

In one embodiment, the pipe utilization and identification program may update either the rotating hour column 200 or the non-rotating hour column 202 at least ten times per minute. This allows real time storage of rotating hours for each piece 14 being used in the drill string. Real time reports can be generated from the pipe utilization and identification program at any time by actuating the string report function 224 so that rig personnel can monitor the usage of each piece 14 in the drill string and take appropriate corrective action before a costly unexpected event occurs. Furthermore, the loading of the historical information and the automatic and continuous updating of the information in the rotating hour column 200 and the non-rotating hour column 202 provides an accurate record of the historical or cumulative rotating and non-rotating hours of each piece 14, thereby substantially reducing the number of costly inspections needed for determining the level of fatigue of each piece 14.

Figure 13:
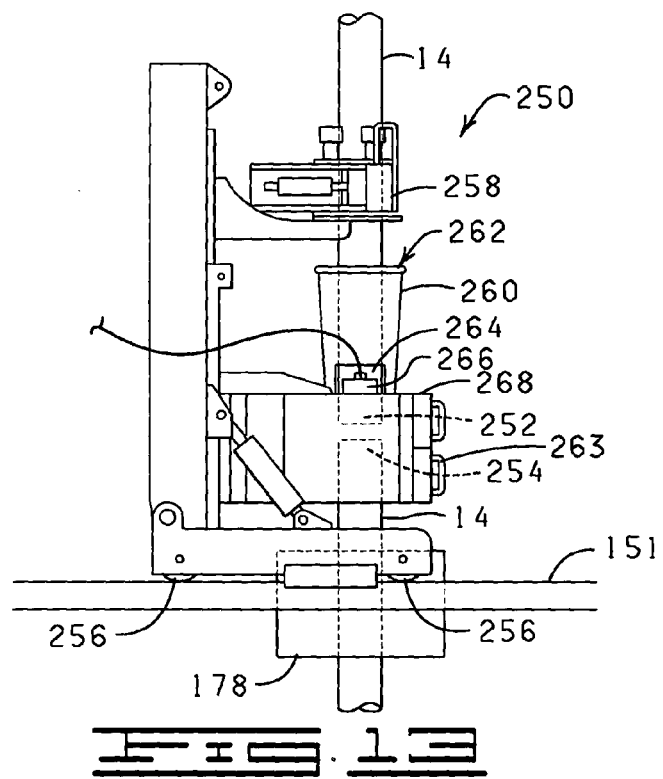
FIG. 13 is a side elevational view of a fixed mount reader constructed in accordance with the present invention wherein the fixed mount reader is mounted onto an apparatus for turning the piece of oilfield equipment.

Referring now to FIG. 13, shown therein is a prior art apparatus 250 for turning the piece 14 of oilfield equipment (in this case a piece of oilfield pipe) to connect a pin connection 252 of the piece 14 to a box connection 254 of an adjacently disposed piece 14 in a well-known manner. The apparatus 250 can be, for example but not by way of limitation, a Model MH 1178 hydraulically operated ROUGHNECK obtainable from Maritime Hydraulics.

The apparatus 250 is supported on wheels 256 which engage tracks (not shown) positioned on the rig floor 151 for moving the apparatus 250 towards and away from the well bore. Formed on an upper end of the apparatus 250 is a pipe spinner assembly 258 (or rotating device) for selectively engaging and turning the piece 14 to connect the pin connection 252 to the box connection 254. A funnel-shaped mudguard 260 can be disposed below the pipe spinner assembly 258. The mudguard 260 defines a mudguard bore 262, which is sized and adapted so as to receive the piece 14 of oilfield equipment therethrough. It should be noted that in some embodiments, the apparatus 250 is not provided with the mudguard 260. The apparatus 250 also includes a torque assembly or torque wrench 263 which (in the embodiment depicted in FIG. 13) is disposed below the pipe spinner assembly 258.

In accordance with the present invention, an opening 264 is formed through the mudguard 260 (when the mudguard 260 is present on the apparatus 250) such that the opening 264 communicates with the mudguard bore 262. In one embodiment, the oilfield equipment identifying apparatus 150 includes a fixed mount reader 266 for automating the reading of the identifier assemblies 12, rather than the hand-held wand 156. The fixed mount reader 266 constructed in accordance with the present invention is mounted onto a flange 268. The flange 268 is located on the apparatus 250 and extends substantially adjacent to the piece 14 of oilfield equipment when the piece 14 of oilfield equipment is being spun by the pipe spinner assembly 258. In the embodiment depicted in FIG. 13, the flange 268 is located substantially adjacent to the opening 264 so as to position the fixed mount reader 266 through the opening 264 whereby the fixed mount reader 266 is located adjacent to the piece 14 of oilfield equipment when the piece 14 of oilfield equipment is being spun by the pipe spinner assembly 258. In general, the fixed mount reader 266 can be located on the apparatus 250 below the pipe spinner assembly 258 and above the torque assembly or torque wrench 263.

Figure 14:
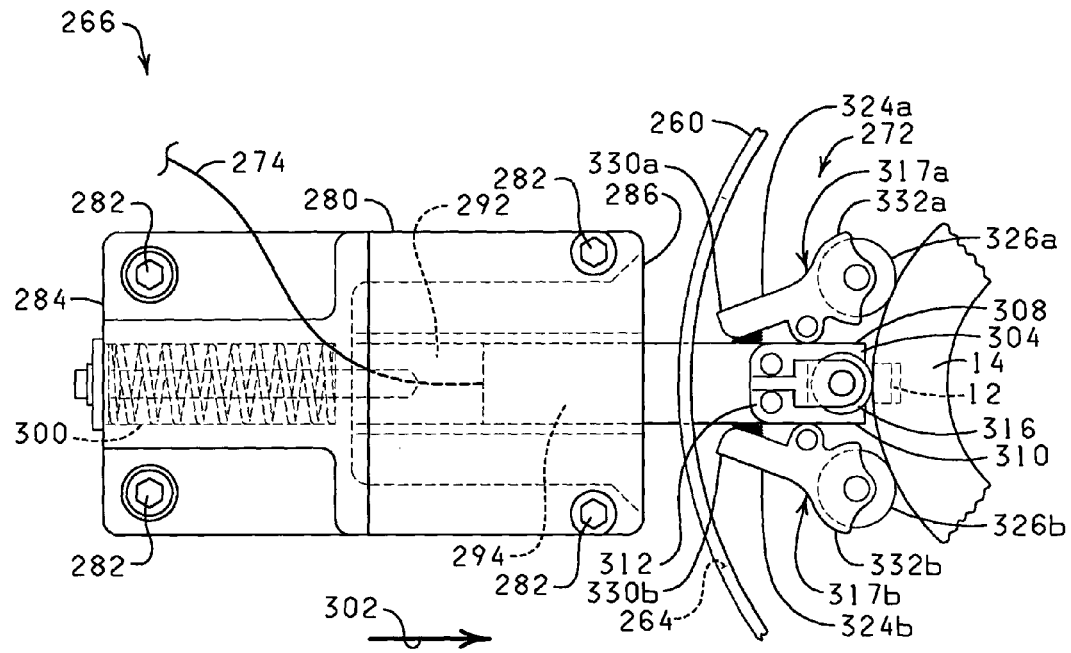
FIG. 14 is a plan view of the fixed mount reader depicted in FIG. 13 wherein the fixed mount reader is positioned to read the identifier assembly mounted onto the piece of oilfield equipment.
Figure 15:
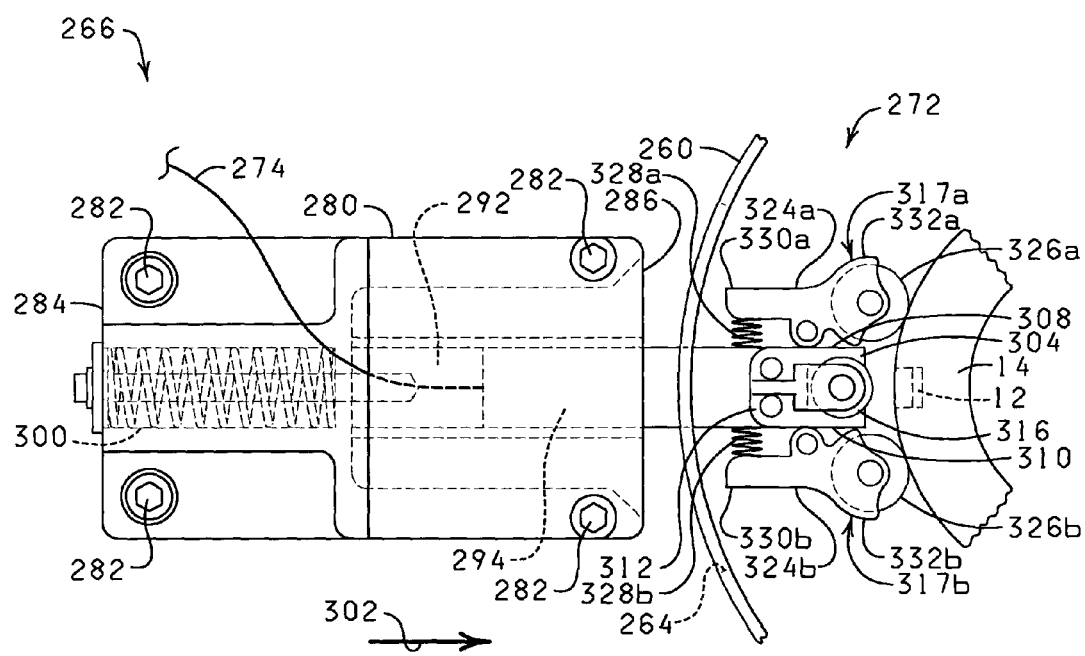
FIG. 15 is a plan view of the fixed mount reader depicted in FIG. 13 wherein the piece of oilfield equipment is being positioned against the fixed mount reader.

As best shown in FIGS. 14–16, a pipe-engaging portion 272 of the fixed mount reader 266 extends through the opening 264 into the mudguard bore 262 whereby the pipe-engaging portion 272 is positioned to engage the piece 14 of oilfield equipment when the piece 14 is disposed within the mudguard 260. Thus, the pipe-engaging portion 272 has access to the identification assemblies 12, which are disposed on or near the pin connection of the respective pieces 14 during the operation of the apparatus 250. When the fixed mount reader 266 is mounted on the apparatus 250, it is possible for the fixed mount reader 266 to read the identification tags 38 (not shown in FIGS. 14–16) within the identifier assemblies 12 without any manual intervention, thus making the reading of the identification assemblies 12 more reliable and safe.

When the apparatus 250 comes into contact with the piece 14 (to either spin it into position or torque it to specification), the pipe engaging portion 272 of the fixed mount reader 266 on the apparatus 250 also comes into contact with the piece 14. As the piece 14 is spun into place, the fixed mount reader 266 reads the identification tag 38 located in the identifier assembly 12, and transmits the unique identification code stored in the identification tag 38 to the electronics conversion package 162 via a signal path 274, whereby the signal including the unique identification code is ultimately transmitted to the central computer 32 via the signal paths 168, 172 and 173, and the profibuss 166 and the interface unit 170 as shown in FIG. 11.

One embodiment of the fixed mount reader 266 will now be described in more detail. The fixed mount reader 266 includes a housing 280. The housing 280 is adapted to be connected to the flange 268 (as best shown in FIG. 16) via any suitable connector assembly, such as a plurality of bolts 281 which are disposed through corresponding openings 282 formed through the housing 280.

As best shown in FIG. 16, the housing 280 is provided with a first end 284, a second end 286, an upper end 288, and a lower end 290. An antenna receiving opening 292 is formed through the second end 286 of the housing 280 and extends a distance therefrom towards the first end 284. The antenna receiving opening 292 is sized and adapted to receive an antenna 294 (which may have a rectangular cross-section) therethrough such that the antenna 294 can be slidably movable in the antenna receiving opening 292 generally toward the piece 14 and away from the piece 14.

The antenna 294 reads the unique identification code stored in the identification tag 38 provided in the identifier assemblies 12 (which are mounted on the pieces 14 as discussed above), and transmits the unique identification code stored in the identification tag 38 to the electronics conversion package 162 via the signal path 274, whereby the signal including the unique identification code is ultimately transmitted to the central computer 32 via the signal paths 168, 172 and 173, and the profibuss 166 and the interface unit 170. When the identification tag 38 is provided with the passive circuit (as discussed hereinbefore), the antenna 294 is tuned to read the unique identification code stored in the identification tag 38.

The housing 280 of the fixed mount reader 266 supports the pipe engaging portion 272 such that the pipe engaging portion 272 extends a distance past the second end 286 of the housing 280. The pipe engaging portion 272 is provided with a rod 296 which is disposed in a corresponding opening 298 formed in the housing 280. The rod 296 is sized and dimensioned to be slidably movable in the opening 298 such that the pipe engaging portion 272 is movable generally away from and towards the second end 286 of the housing 280 and is thereby movable away from and towards the piece 14.

A bias assembly 300 is disposed in the opening 298 and supported by the housing 280. The bias assembly 300 engages the housing 280 and the rod 296 so as to bias the rod 296 in a direction 302 generally towards the piece 14. Thus, the bias assembly 300 maintains the pipe engaging portion 272 securely engaged with the piece 14 as the apparatus 250 is spinning or torquing the piece 14 into its proper position. Furthermore, the bias assembly 300 absorbs any impact from the piece 14 with the apparatus 250 when the piece 14 is moved against the pipe engaging portion 272. In one embodiment, the bias assembly 300 can be a spring.

As best shown in FIG. 16, the pipe engaging portion 272 of the fixed mount reader includes a housing 304. The housing 304 is connected to the rod 296 and is thereby supported by the rod 296.

The housing 304 of the pipe engaging portion 272 is provided with an antenna receiving opening 306, which is aligned with the antenna receiving opening 292 formed in the housing 280 of the fixed mount reader 266. The antenna 294 extends into the antenna receiving opening 306 and is secured to the housing 304 via any suitable connector assembly, such as bolts.

The housing 304 of the pipe engaging portion 272 includes a first side 308, a second side 310, an upper end 312 and a lower end 314. The pipe engaging portion 272 includes a pair of fixed roller assemblies 316, and a pair of movable roller assemblies 317 for maintaining the antenna 294 at a preselected distance from the piece 14 while the antenna 294 is reading the identification tags 38 mounted on the piece 14.

The fixed roller assemblies 316 include a roller mount 318 and a roller 320. For purposes of clarity, the fixed roller assemblies 316, the movable roller assemblies 317, the roller mounts 318 and the rollers 320 are designated in FIGS. 14–16 with the same numeral prefix, i.e., "316", "317", "318" and "320", but with different alphabetic suffixes "a" and "b." The roller mount 318a of the fixed roller assembly 316a is connected to the upper end 312 of the housing 304 such that at least a portion of the roller 320a extends past the housing 304 to engage the piece 14. The roller mount 318b of the fixed roller assembly 316b is connected to the lower end 314 of the housing 304 such that at least a portion of the roller 320b extends past the housing 304 to engage the piece 14.

Each of the movable roller assemblies 317a and 317b includes a leg 324, a roller 326 and a bias assembly 328. The leg 324 includes a first end 330 and a second end 332. The bias assembly 328 is mounted on the first end 330 of the leg 324, and the roller 326 is mounted on the second end 332 of the leg 324.

The movable roller assembly 317a is pivotally connected to the first side 308 of the housing 304 such that the roller 326a extends past the housing 304 to engage the piece 14, and the bias assembly 328a engages the housing 304 to force the roller 326a against the piece 14 thereby maintaining the roller 326a securely engaged with the piece 14 during reading of the identification tag 38. The movable roller assembly 317b is pivotally connected to the second side 310 of the housing 304 such that the roller 326b extends past the housing 304 to engage the piece 14, and the bias assembly 328b engages the housing 304 to force the roller 326b against the piece 14 thereby maintaining the roller 326b securely engaged with the piece 14 during reading of the identification tag 38.

Changes may be made in the embodiments of the invention described herein, or in the parts or the elements of the embodiments described herein, or in the steps or sequence of steps of the methods described herein, without departing from the spirit and/or the scope of the invention as defined in the following claims.

What is claimed is:

1. An oilfield equipment identifying apparatus comprising:
   a computer loaded with an oilfield equipment database;
   means for inputting into the computer a unique identification code for each piece of oilfield equipment in a drill string to form a reference in the oilfield equipment database to each piece of oilfield equipment in the drill string; and
   a drilling monitoring device constantly detecting movement of a drilling device associated with the drill string by automatically receiving input signals indicative of at least one of rotating and non-rotating usage of the drill string and outputting real-time signals to the computer wherein the computer continuously and automatically monitors the cumulative rotating usage and non-rotating usage of each piece of oilfield equipment identified in the drill string.

2. An oilfield equipment identifying apparatus comprising:
   a computer loaded with an oilfield equipment database;
   means for inputting into the computer a unique identification code for each piece of oilfield equipment in thea drill string to form a reference in the oilfield equipment database to each piece of oilfield equipment in the drill string; and
   means for monitoring a drilling device and outputting signals to the computer wherein the computer continuously and automatically monitors the cumulative rotating usage and non-rotating usage of each piece of oilfield equipment identified in the drill string.

* * * * *

UNITED STATES PATENT AND TRADEMARK OFFICE
CERTIFICATE OF CORRECTION

PATENT NO. : 6,973,416 B2
APPLICATION NO. : 10/634061
DATED : December 6, 2005
INVENTOR(S) : Lawrence A. Denny and Edward E. Patterson It is certified that error appears in the above-identified patent and that said Letters Patent is hereby corrected as shown below:

Column 10, Line 66: After the word "grid" delete the number "1186" and add the number --186--.

Column 14, Line 54: After the word "in", delete the word "thea" and add the word --the--.

Signed and Sealed this

Twenty-fifth Day of July, 2006

JON W. DUDAS
*Director of the United States Patent and Trademark Office*